United States Patent
Gupta et al.

(10) Patent No.: US 12,528,449 B2
(45) Date of Patent: Jan. 20, 2026

(54) STATE QUANTITY CALCULATION DEVICE, CONTROL DEVICE, AND VEHICLE

(71) Applicant: HITACHI ASTEMO, LTD., Ibaraki (JP)

(72) Inventors: Vaibhav Gupta, Ibaraki (JP); Yuichiro Minakuchi, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 691 days.

(21) Appl. No.: 17/666,910

(22) Filed: Feb. 8, 2022

(65) Prior Publication Data

US 2022/0161781 A1     May 26, 2022

Related U.S. Application Data (63) Continuation of application No. PCT/JP2019/045907, filed on Nov. 25, 2019.

(30) Foreign Application Priority Data

Sep. 26, 2019    (JP) ................ 2019-175961

(51) Int. Cl.
*B60W 30/02*     (2012.01)
*B60G 17/0165*     (2006.01)
(Continued)

(52) U.S. Cl.
CPC ......... *B60W 30/02* (2013.01); *B60G 17/0165* (2013.01); *B60G 17/0182* (2013.01);
(Continued)

(58) Field of Classification Search
CPC .................... B60W 30/02; B60G 17/0182
See application file for complete search history.

(56) References Cited

U.S. PATENT DOCUMENTS

2014/0005889 A1*   1/2014   Hayakawa ....... B60G 17/01933
                                                                                 701/37
2015/0290995 A1   10/2015   Kanda et al.
(Continued)

FOREIGN PATENT DOCUMENTS

JP        2013-010428      1/2013
JP          5886956       3/2016
(Continued)

OTHER PUBLICATIONS

Office Action for JP2019-175961, mailed Jul. 28, 2020.
Office Action for JP2019-175961, mailed Jan. 21, 2020.
Written Opinion for PCT/JP2019/045907 and its English translation (International Preliminary Report on Patentability), mailed Jan. 28, 2020.

(Continued)

*Primary Examiner* — Imran K Mustafa
(74) *Attorney, Agent, or Firm* — Casimir Jones, S.C.; Robert A. Goetz (57) ABSTRACT

Realized is a technique of highly accurately calculating a state quantity of a vehicle. An ECU (600) of a vehicle (900) includes a ground contact load calculating section (610), an input quantity calculating section (620), a first state quantity calculating section (630), an observable calculating section (640), a second state quantity calculating section (650), and a damper ECU (660). The ECU (600) calculates a first state quantity of the vehicle (900) by inputting, into a vehicle model, a value calculated from a G sensor value and/or the like, and calculates a second state quantity of the vehicle (900) by correcting the first state quantity with use of an observable which is calculated from a ground contact load and a spring constant gain of a tire.

10 Claims, 3 Drawing Sheets

(51) Int. Cl.
  *B60G 17/018* (2006.01)
  *B60W 10/20* (2006.01)
  *B60W 10/22* (2006.01)
  *B60W 40/06* (2012.01)
  *B60W 50/00* (2006.01)

(52) U.S. Cl.
  CPC ............ *B60W 10/20* (2013.01); *B60W 10/22* (2013.01); *B60W 40/06* (2013.01); *B60W 50/00* (2013.01); *B60G 2400/208* (2013.01); *B60G 2400/252* (2013.01); *B60G 2400/60* (2013.01); *B60G 2400/821* (2013.01); *B60W 2050/0052* (2013.01); *B60W 2520/28* (2013.01); *B60W 2530/10* (2013.01); *B60W 2530/20* (2013.01); *B60W 2552/35* (2020.02); *B60W 2710/20* (2013.01); *B60W 2710/22* (2013.01)

(56) References Cited

U.S. PATENT DOCUMENTS

| | | |
|---|---|---|
| 2016/0264148 A1 | 9/2016 | Liu |
| 2020/0270824 A1* | 8/2020 | Nagayama .............. E01C 23/01 |
| 2020/0317198 A1* | 10/2020 | Hashemi ............. B60W 40/068 |
| 2020/0331317 A1 | 10/2020 | Nasu et al. |

FOREIGN PATENT DOCUMENTS

| | | |
|---|---|---|
| JP | 2016-168887 | 9/2016 |
| JP | 2019-89504 | 6/2019 |
| JP | 2019-119380 | 7/2019 |

OTHER PUBLICATIONS

International Search Report for PCT/JP2019/045907 and its English translation, mailed Jan. 28, 2020, 2 pages.

* cited by examiner

STATE QUANTITY CALCULATION DEVICE, CONTROL DEVICE, AND VEHICLE

This application is a Continuation of PCT International Application No. PCT/JP2019/045907 filed in Japan on Nov. 25, 2019, which claims the benefit of Patent Application No. 2019-175961 filed in Japan on Sep. 26, 2019, the entire contents of which are hereby incorporated by reference.

TECHNICAL FIELD

The present invention relates to a state quantity calculating device, a control device, and a vehicle.

BACKGROUND ART

Conventionally, there is known a technique of enhancing running stability of a vehicle by calculating a state quantity of the vehicle and controlling a braking force, a driving force, and the like of the vehicle with use of a calculated value of the state quantity. As such a technique, there is known a technique of (i) acquiring a longitudinal movement component of a wheel, which longitudinal movement component results from a displacement of a suspension, from a wheel speed, (ii) calculating movement of the suspension (suspension stroke speed) from the longitudinal movement component, and (iii) controlling the suspension with use of the obtained suspension stroke speed (see, for example, Patent Literature 1).

CITATION LIST

Patent Literature

[Patent Literature 1]
Japanese Patent Application Publication Tokukai No. 2013-010428

SUMMARY OF INVENTION

Technical Problem

In the foregoing conventional technique, accuracy of computing the suspension stroke speed may decrease depending on a design of the vehicle. For example, as an angle at which the suspension stands becomes more perpendicular to a road surface, longitudinal movement of the wheel with respect to the displacement of the suspension tends to be smaller. Thus, in the conventional technique, there is room for consideration, from the viewpoint of highly accurately calculating the state quantity (such as the movement of the suspension) of the vehicle regardless of a design matter (such as the angle at which the suspension stands) of the vehicle.

The object of an aspect of the present invention is to realize a technique of highly accurately calculating a state quantity of a vehicle.

Solution to Problem

In order to attain the above object, a state quantity calculating device in accordance with an aspect of the present invention is a state quantity calculating device including: a ground contact load calculating section which calculates a ground contact load that is a load acting in a vertical direction under a spring of a vehicle; a tire change amount calculating section which calculates a current amount of a change in a tire from the ground contact load, which is calculated by the ground contact load calculating section, and a spring constant gain of the tire; and a state quantity calculating section which calculates a state quantity of the vehicle by inputting the amount of the change in the tire, which is calculated by the tire change amount calculating section, into a vehicle model.

Further, in order to attain the above object, a state quantity calculating device in accordance with an aspect of the present invention is a state quantity calculating device including: a ground contact load calculating section which calculates a ground contact load that is a load acting in a vertical direction under a spring of a vehicle; an input quantity calculating section which calculates an input quantity with use of at least a sensor value of a G sensor that is included in the vehicle; a first state quantity calculating section which calculates a first state of the vehicle by inputting the input quantity, which is calculated by the input quantity calculating section, into a vehicle model; an observable calculating section which calculates an observable from the ground contact load, which is calculated by the ground contact load calculating section, and a spring constant gain of a tire; and a second state quantity calculating section which calculates a second state quantity of the vehicle by correcting the first state quantity of the vehicle, which is calculated by the first state quantity calculating section, with use of the observable, which is calculated by the observable calculating section.

In order to attain the above object, a state quantity calculating device in accordance with an aspect of the present invention is a state quantity calculating device including: a ground contact load calculating section which calculates a ground contact load that is a load acting in a vertical direction under a spring of a vehicle; an input quantity calculating section which calculates an input quantity with use of at least a sensor value of a G sensor that is included in the vehicle; a first state quantity calculating section which calculates a first state quantity of the vehicle by inputting the input quantity, which is calculated by the input quantity calculating section, into a vehicle model; an observable configuring section which configures an observable with use of the ground contact load, which is calculated by the ground contact load calculating section; and a second state quantity calculating section which calculates a second state quantity of the vehicle by correcting the first state quantity of the vehicle, which is calculated by the first state quantity calculating section, with use of the observable, which is configured by the observable configuring section.

In order to attain the above object, a control device in accordance with an aspect of the present invention is a control device including: the state quantity calculating device described above; and a control section which controls a device that is included in the vehicle, with use of the state quantity of the vehicle, which is calculated by the state quantity calculating device.

In order to attain the above object, a vehicle in accordance with an aspect of the present invention is a vehicle including the control device described above.

Advantageous Effects of Invention

In an aspect of the present invention, it is possible to highly accurately calculate a state quantity of a vehicle.

DESCRIPTION OF EMBODIMENTS

The following description will discuss an embodiment of the present invention in detail.
[Example of Configuration of Vehicle]
(Outline of Configuration)

Figure 1:
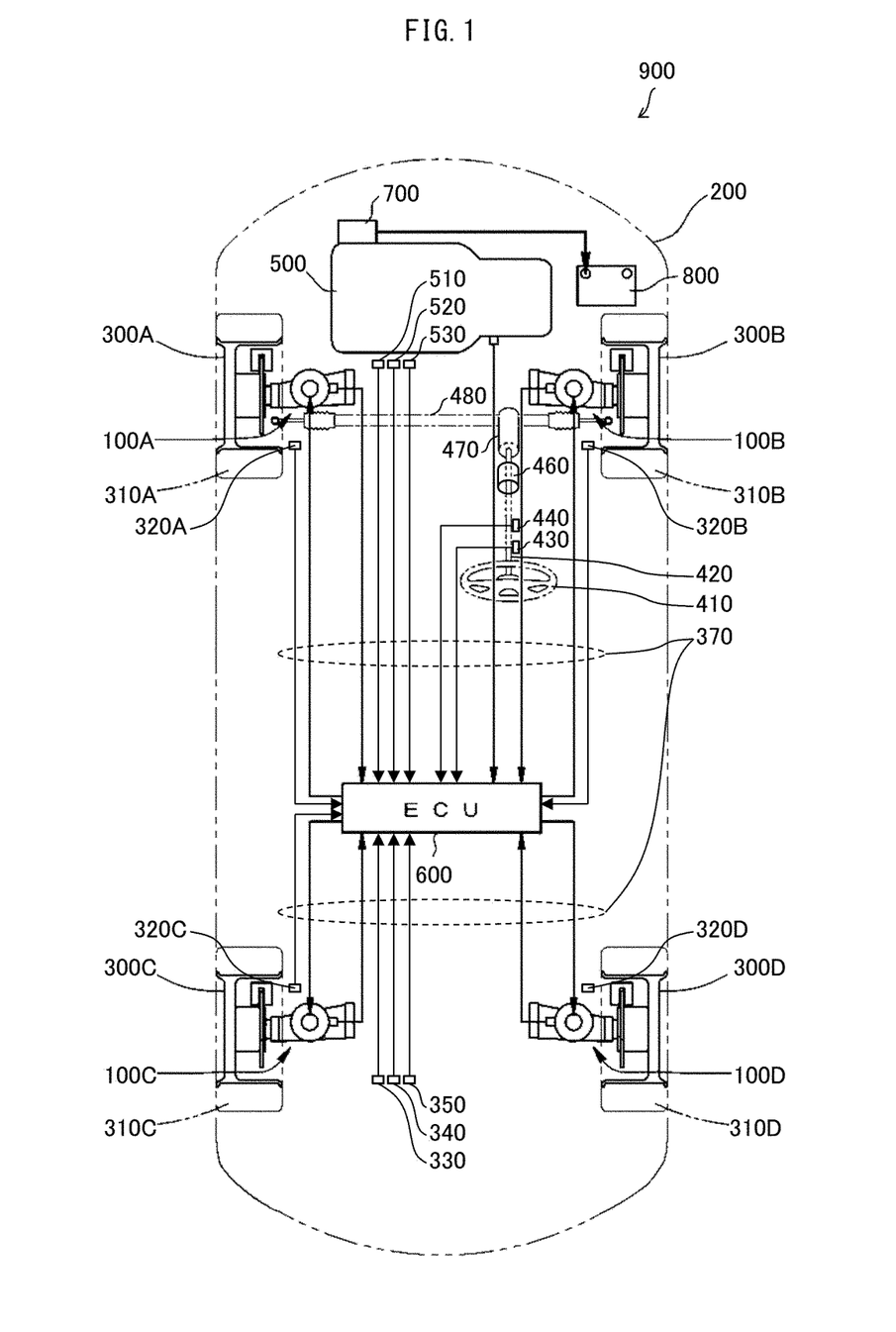
FIG. 1 is a drawing schematically illustrating an example of a configuration of a vehicle in accordance with an embodiment of the present invention.

FIG. 1 is a drawing schematically illustrating an example of a configuration of a vehicle 900 in accordance with an embodiment of the present invention. As illustrated in FIG. 1, the vehicle 900 includes suspensions 100, a vehicle body 200, wheels 300, tires 310, a steering member 410, a steering shaft 420, a torque sensor 430, a steering angle sensor 440, a torque applying section 460, a rack-and-pinion mechanism 470, a rack shaft 480, an engine 500, an electronic control unit (ECU) (state quantity calculating device, control device) 600, an electric generator 700, and a battery 800. Note that examples of the vehicle 900 include gasoline-powered vehicles, hybrid electric vehicles (HEVs), and electric vehicles (EVs).

The wheels 300 on which the respective tires 310 are mounted are suspended on the vehicle body 200 by the respective suspensions 100. The vehicle 900 is a four-wheeled vehicle, and therefore includes four suspensions 100, four wheels 300, and four tires 310. A tire and a wheel which constitute a left front wheel are also referred to as a tire 310A and a wheel 300A, respectively. A tire and a wheel which constitute a right front wheel are also referred to as a tire 310B and a wheel 300B, respectively. A tire and a wheel which constitute a left rear wheel are also referred to as a tire 310C and a wheel 300C, respectively. A tire and a wheel which constitute a right rear wheel are also referred to as a tire 310D and a wheel 300D, respectively. Similarly, a configuration which is associated with the left front wheel may be denoted by a sign "A", a configuration which is associated with the right front wheel may be denoted by a sign "B", a configuration which is associated with the left rear wheel may be denoted by a sign "C", and a configuration which is associated with the right rear wheel may be denoted by a sign "D".
(Suspension)

Each of the suspensions 100 includes a hydraulic shock absorber, an upper arm, and a lower arm. The hydraulic shock absorber includes, for example, a solenoid valve which is an electromagnetic valve that adjusts a damping force generated by the hydraulic shock absorber. Note, however, that the present embodiment is not limited to this configuration. The hydraulic shock absorber may employ, as an electromagnetic valve which adjusts a damping force, an electromagnetic valve other than the solenoid valve. For example, the hydraulic shock absorber may include, as the electromagnetic valve, an electromagnetic valve in which an electromagnetic fluid (magnetic fluid) is used.
(Steering Device)

The steering member 410, which is operated by a driver, is connected to one end of the steering shaft 420 so that a torque can be transmitted from the steering member 410 to the steering shaft 420. The other end of the steering shaft 420 is connected to the rack-and-pinion mechanism 470.

Note that the expression "connected . . . so that a torque can be transmitted" in the above description means that members are connected to each other so that rotation of one of the members causes rotation of the other of the members. Examples of such connection at least encompass (i) a case where the members are integrally molded, (ii) a case where one of the members is directly or indirectly fixed to the other of the members, and (iii) a case where the members are connected to each other via a joint member or the like so that the members move in conjunction with each other.

The rack-and-pinion mechanism 470 is a mechanism for converting axial rotation of the steering shaft 420 into an axial displacement of the rack shaft 480. The axial displacement of the rack shaft 480 causes the wheel 300A and the wheel 300B to be turned via respective tie rods and respective knuckle arms.

The torque sensor 430 detects a steering torque applied to the steering shaft 420, i.e., a steering torque applied to the steering member 410, and supplies, to the ECU 600, a torque sensor signal indicative of a result of this detection. More specifically, the torque sensor 430 detects torsion of a torsion bar provided inside the steering shaft 420, and outputs a result of this detection as the torque sensor signal. Note that a magnetostrictive torque sensor may be used as the torque sensor 430.

The steering angle sensor 440 detects a steering angle of the steering member 410, and supplies a result of this detection to the ECU 600.

The torque applying section 460 applies, to the steering shaft 420, an assist torque or a reaction torque corresponding to a steering control variable supplied from the ECU 600. The torque applying section 460 includes: a motor which generates the assist torque or the reaction torque corresponding to the steering control variable; and a torque transmitting mechanism which transmits, to the steering shaft 420, the assist torque or the reaction torque generated by the motor.

Note that, in this specification, specific examples of the "control variable" encompass a current value, a duty ratio, a damping rate, and a damping ratio.

Note also that although the above description takes, as an example, a steering device in which members from the steering member 410 to the rack shaft 480 are mechanically connected to one another all the time, the present embodiment is not limited to this configuration. The steering device in accordance with the present embodiment may be, for example, a steering device of a steer-by-wire system. The matters described below in this specification are also applicable to the steering device of a steering-by-wire system.
(Driving Force Transmitting Device)

The vehicle 900 includes a driving force transmitting device (not illustrated). The driving force transmitting device is, for example, a device which transmits power of the engine to the front wheels or the rear wheels, and has a gear transmitting mechanism. The gear transmitting mechanism is a differential which makes, depending on a situation, a difference in rotation speed between the wheels which are included in the respective front wheels or the respective rear wheels, and has a limited slip differential which limits the difference depending on a running situation of the vehicle 900. In the present embodiment, the differential and the limited slip differential are each not limited to any particular one. The differential may be, for example, a differential of a bevel gear type. The limited slip differential may be a limited slip differential of a torque sensitive type (such as a limited slip differential (LSD) of a multiple disc clutch type or an LSD of a helical gear type) or may be alternatively a limited slip differential of a rotation difference sensitive type (such as a viscous LSD).

(Other Configuration)

The electric generator 700 is attached to the engine 500. Electric power generated by the electric generator 700 is accumulated in the battery 800.

The vehicle 900 includes wheel speed sensors 320 which are provided with respect to the respective wheels 300 and which detect wheel speeds (angular speeds ω) of the respective wheels 300. The vehicle 900 may be configured to include: a lateral G sensor 330 which detects an acceleration of the vehicle 900 in a lateral direction of the vehicle 900; a longitudinal G sensor 340 which detects an acceleration of the vehicle 900 in a longitudinal direction of the vehicle 900; a yaw rate sensor 350 which detects a yaw rate of the vehicle 900; an engine torque sensor 510 which detects a torque generated by the engine 500; an engine speed sensor 520 which detects a rotation speed of the engine 500; and a brake pressure sensor 530 which detects a pressure applied to a brake fluid of a brake device. A result of detection made by each of these sensors is supplied to the ECU 600.

Note that although not illustrated, the vehicle 900 includes a brake device which is capable of performing control by means of (i) an antilock brake system (ABS), which is a system for preventing the wheels from being locked during braking, (ii) a traction control system (TCS), which prevents wheelspins during, for example, acceleration, and (iii) a vehicle stability assist (VSA), which is a control system that stabilizes vehicle behavior and that has an automatic braking function for yaw moment control during turning, a brake assist function, and the like.

The ABS, the TCS, and the VSA compare (i) a wheel speed determined in accordance with an estimated vehicle body speed and (ii) a wheel speed detected by each of the wheel speed sensors 320. In a case where a difference between values of these two wheel speeds is not less than a predetermined value, the ABS, the TCS, and the VSA determine that the vehicle is slipping. The ABS, the TCS, and the VSA are intended to stabilize behavior of the vehicle 900 by performing optimal brake control and traction control in accordance with a running state of the vehicle 900 through the above process.

Supply of the result of the detection made by each of the foregoing sensors to the ECU 600 and transmission of a control signal from the ECU 600 to each of the sections are carried out via a controller area network (CAN) 370.

The vehicle 900 also includes a random access memory (RAM) (not illustrated). In the RAM, steady-state values or estimated values (such as a vehicle weight, an inertia load, various factors of the vehicle, and the like) and/or calculated values are stored. The steady-state values are, for example, values of physical quantities inherent in the vehicle 900.

The vehicle 900 further includes an ECU (not illustrated) for controlling operation of each of the suspensions 100, an ECU (not illustrated) for controlling operation of the steering device, and an ECU (not illustrated) for controlling operation of the driving force transmitting device. For example, the vehicle 900 includes a damper ECU for controlling each of the suspensions 100. Such a device-specific ECU included in the vehicle 900 may be provided to a device which is controlled thereby, or may be provided to the ECU 600 which is for controlling the vehicle 900. As such, the suspensions 100, the steering device, and the driving force transmitting device of the vehicle 900 are each configured so as to be capable of being electronically controlled. Thus, it can be said that the suspensions 100 are electronically controlled suspensions, the steering device is an electronically controlled steering device, and the driving force transmitting device is an electronically controlled driving force transmitting device.

(Outline of Control of Suspension)

The ECU 600 controls each of the suspensions 100 by supplying a suspension control variable. More specifically, the ECU 600 controls opening and closing of the solenoid valve of the hydraulic shock absorber included in each of the suspensions 100, by supplying the suspension control variable to the solenoid valve. In order that this control is enabled, an electric power line through which drive electric power is supplied from the ECU 600 to the solenoid valve is provided.

(Outline of Control of Steering)

The ECU 600 also controls, in a centralized manner, various electronic devices included in the vehicle 900. More specifically, the ECU 600 controls a magnitude of the assist torque or the reaction torque to be applied to the steering shaft 420, by adjusting the steering control variable to be supplied to the torque applying section 460.

(Outline of Control of Driving Force Transmitting Device)

The ECU 600 controls the driving force transmitting device by, for example, supplying a control variable for a differential limit. A specific example of such control is as follows: the ECU 600 controls the rotation speed of each of the wheels, which rotate by a driving force of the engine, by adjusting strength of engagement of a clutch in an LSD of a multiple disc clutch type depending on the running situation and thereby distributing the driving force of the engine between (i) the front wheels and (ii) the rear wheels or between the right wheel and the left wheel which are included in the respective front wheels or the respective rear wheels.

(Explanation of Logic of Calculation of State Quantity)

Definition of State Quantity

An example of a state quantity X of the vehicle 900 in accordance with the present embodiment is expressed by the following expression. Note, here, that the state quantity X is a vector expressed by a matrix of n×1 and n=16 in this example. Note that, in this specification, subscripts "fl", "fr", "rl", and "rr" denote the left front wheel, the right front wheel, the left rear wheel, and the right rear wheel, respectively, of the vehicle 900. Note also that a subscript "ii" denotes any one or more of the wheels of the vehicle 900.

$$x = [w, p, q, r, w_{lfl}, w_{lfr}, w_{lrl}, w_{lrr}, \text{DampSt}_{fl}, \text{DampSt}_{fr}, \text{DampSt}_{rl}, \text{DampSt}_{rr}, \text{TireSt}_{fl}, \text{TireSt}_{fr}, \text{TireSt}_{rl}, \text{TireSt}_{rr}]^T$$

In the above expression, w is a sprung centroid vertical speed and is a component of a sprung speed of the vehicle body 200 in a direction of a z axis. Further, p, q, and r are a roll rate, a pitch rate, and a yaw rate, respectively, and are, for example, a component in a direction of x-axis rotation, a component in a direction of y-axis rotation, and a component in a direction of z-axis rotation, respectively, of a sprung angular speed of the vehicle body 200. Note that, in the present embodiment, an x axis indicates a longitudinal direction of the vehicle body 200, a y axis indicates a lateral direction of the vehicle body 200, and the z axis indicates a vertical direction of the vehicle body 200.

In the above expression, $w_{lfl}$, $w_{lfr}$, $w_{lrl}$, and $w_{lrr}$ are unsprung vertical speeds at the respective wheels. $\text{DampSt}_{fl}$, $\text{DampSt}_{fr}$, $\text{DampSt}_{rl}$, and $\text{DampSt}_{rr}$ are suspension stroke displacements at the respective wheels. $\text{TireSt}_{fl}$, $\text{TireSt}_{fr}$, $\text{TireSt}_{rl}$, and $\text{TireSt}_{rr}$ are tire stroke displacements at the respective wheels.

<Equations of Motion Relating to State Quantity>

Examples of equations of motion of elements which constitute the state quantity X are expressed by the following expressions (1) to (7). A dot "•" added on each physical quantity denotes a time derivative.

$$\dot{w} = \frac{\Sigma R_z}{m_2} - pv + qu \tag{1}$$

$$\dot{p} = \frac{\frac{I_{zx}}{I_z}((I_x - I_y)pq - I_{zx}qr + M_z) + (I_y - I_z)qr + I_{zx}pq + M_x}{I_x\left(1 - \frac{I_{zx}^2}{I_x I_z}\right)} \tag{2}$$

$$\dot{q} = \frac{M_y + (I_z - I_x)rp + I_{zx}(r^2 - p^2)}{I_y} \tag{3}$$

$$\dot{r} = \frac{\frac{I_{zx}}{I_x}((I_y - I_z)qr + I_{zx}pq + M_x) + (I_x - I_y)pq - I_{zx}qr + M_z}{I_z\left(1 - \frac{I_{zx}^2}{I_x I_z}\right)} \tag{4}$$

In the expression (1), $\Sigma R_z$ denotes a vertical force which acts on the centroid of the vehicle body 200, $m_2$ denotes a sprung mass of the vehicle body 200, u denotes a sprung speed of the vehicle body 200 in the longitudinal direction, and v denotes a sprung speed of the vehicle body 200 in the lateral direction.

In the expressions (2) to (4), $I_{zx}$ denotes a product of inertia in the lateral direction (for example, y axis) on springs of the vehicle body 200, $I_x$ denotes a moment of inertia about the x axis through the centroid of the vehicle body 200, $I_y$ denotes a moment of inertia about the y axis through the centroid of the vehicle body 200, and $I_z$ denotes a moment of inertia about the z axis through the centroid of the vehicle body 200. Further, in the expressions (2) to (4), $M_x$ denotes a moment about the x axis which moment acts on the centroid of the vehicle body 200, $M_y$ denotes a moment about the y axis which moment acts on the centroid of the vehicle body 200, and $M_z$ denotes a moment about the z axis which moment acts on the centroid of the vehicle body 200.

$$\dot{w}_{1,ii} = -\frac{k_{1ii} \cdot TireSt_{ii}}{m_{1ii}} - \frac{R_{zii}}{m_{1ii}} \tag{5}$$

In the expression (5), $m_{1ii}$ denotes an unsprung mass of any of the wheels, $R_{zii}$ denotes a suspension reaction force which acts under a spring at each of the wheels, and $k_{1ii}$ denotes a tire spring constant of the any of the wheels.

$$DampSt_{ii} = DampV_{ii} = w_{ii} - w_{1,ii} \tag{6}$$

$$TireSt_{ii} = TireV_{ii} = w_{1,ii} - w_{0,ii} \tag{7}$$

In the expression (6), $DampV_{ii}$ denotes a suspension stroke speed at each of the wheels, and $w_{ii}$ denotes a vertical speed of a suspension point on the spring at each of the wheels. In the expression (7), $TireV_{ii}$ denotes a tire stroke speed of each of the wheels, and $w_{0ii}$ denotes a derivative value of a road surface displacement at any of wheel points. $w_{ii}$ is expressed by any of the following expressions (6a) to (6d). In the expressions (6a) to (6d), $tr_f$ and $tr_r$ denote a front tread half-length and a rear tread half-length, respectively, of the vehicle body 200, and $l_f$ and $l_r$ denote a front axle-centroid distance and a rear axle-centroid distance, respectively, of the vehicle body 200.

$$w_{fl} = w + tr_f p - l_f q \tag{6a}$$

$$w_{fr} = w - tr_f p - l_f q \tag{6b}$$

$$w_{rl} = w + tr_r p + l_r q \tag{6c}$$

$$w_{rr} = w - tr_r p + l_r q \tag{6d}$$

<Expression for External Force/Moment>

The external forces and the moments in the above equations of motion are each expressed by, for example, a corresponding one of expressions (8) to (23) described below. For example, the suspension reaction force is expressed by any of the following expressions (8) to (11).

$$R_{zfl} = -k_{2f}(DampSt_{fl}) - c_{2f}(DampV_{fl}) - k_{af}(DampSt_{fl} - DampSt_{fr}) - DampF_{fl} \tag{8}$$

$$R_{zfr} = -k_{2f}(DampSt_{fr}) - c_{2f}(DampV_{fr}) + k_{af}(DampSt_{fl} - DampSt_{fr}) - DampF_{fr} \tag{9}$$

$$R_{zrl} = -k_{2r}(DampSt_{rl}) - c_{2r}(DampV_{rl}) - k_{ar}(DampSt_{rl} - DampSt_{rr}) - DampF_{rl} \tag{10}$$

$$R_{zrr} = -k_{2r}(DampSt_{rr}) - c_{2r}(DampV_{rr}) + k_{ar}(DampSt_{rl} - DampSt_{rr}) - DampF_{rr} \tag{11}$$

In the expressions (8) to (11), $R_{zfl}$, $R_{zfr}$, $R_{zrl}$, and $R_{zrr}$ denote suspension reaction forces at the respective wheels. $DampF_{fl}$, $DampF_{fr}$, $DampF_{rl}$, and $DampF_{rr}$ denote damper damping forces at the respective wheels. Further, in the expressions (8) to (11), $k_{2f}$ denotes a spring constant of the suspension spring at a corresponding one of the front wheels, $k_{2r}$ denotes a spring constant of the suspension spring at a corresponding one of the rear wheels, $C_{2f}$ denotes a parameter which is for enhancing stability of a vehicle model (described later) and which relates to the corresponding one of the front wheels, $C_{2r}$ denotes a parameter which is for enhancing the stability of the vehicle model and which relates to the corresponding one of the rear wheels, $k_{af}$ denotes stiffness of a stabilizer at the corresponding one of the front wheels, and $k_{ar}$ denotes stiffness of a stabilizer at the corresponding one of the rear wheels.

A longitudinal force $\Sigma R_x$ which acts on the centroid of the vehicle body 200, a lateral force $\Sigma R_y$ which acts on the centroid of the vehicle body 200, and a vertical force $\Sigma R_z$ which acts on the centroid are expressed by the following expressions (12) to (14), respectively.

$$\Sigma R_x = \Sigma F_{x0} - \frac{\Sigma F_{x0} \cdot \Sigma m_{1ii}}{(m_2 + \Sigma m_{1ii})} \tag{12}$$

$$\Sigma R_y = \Sigma F_{y0} - \frac{\Sigma F_{y0} \cdot \Sigma m_{1ii}}{(m_2 + \Sigma m_{1ii})} \tag{13}$$

$$\Sigma R_z = R_{zfl} + R_{zfr} + R_{zrl} + R_{zrr} \tag{14}$$

In the expressions (12) and (13), $\Sigma F_{x0}$ denotes a longitudinal force of all the tires of the vehicle 900, and $\Sigma F_{y0}$ denotes a lateral force of all the tires of the vehicle 900.

$$M_{xR} = tr_f (R_{zfl} - R_{zfr}) + tr_r (R_{zrl} - R_{zrr}) + h_1 (\Sigma R_y) \tag{15}$$

$$M_{yR} = -l_f (R_{zfl} + R_{zfr}) + l_r (R_{zrl} + R_{zrr}) - h_1 (\Sigma R_x) \tag{16}$$

$$M_{zR} \approx 0 \tag{17}$$

In the expressions (15) to (17), $M_{xR}$ denotes a reaction moment about the x axis of the suspensions which reaction moment acts on the centroid of the vehicle body 200, $M_{yR}$ denotes a reaction moment about the y axis of the suspensions which reaction moment acts on the centroid of the vehicle body 200, and $M_{zR}$ denotes a reaction moment about the z axis of the suspensions which reaction moment acts on the centroid of the vehicle body 200. Further, in the expressions (15) to (17), $h_1$ denotes an average of distances, in the direction of the z axis, from the centroid of the vehicle 900 to a position under the spring at each of the wheels.

$$M_{x,tire} = R_0 \, (\Sigma F_{y0}) \tag{18}$$

$$M_{y,tire} = R_0 \, (\Sigma F_{x0}) \tag{19}$$

$$M_{z,tire} \approx 0 \tag{20}$$

In the expressions (18) to (20), $M_{xtire}$ denotes a reaction moment about the x axis of the tires which reaction moment acts on the centroid of the vehicle body 200, $M_{ytire}$ denotes a reaction moment about the y axis of the tires which reaction moment acts on the centroid of the vehicle body 200, and $M_{ztire}$ denotes a reaction moment about the z axis of the tires which reaction moment acts on the centroid. Further, $R_0$ denotes a tire radius. Note that $M_x$, $M_y$, and $M_z$ are expressed by the following expressions (21) to (23), respectively.

$$M_x = M_{xR} + M_{x,tire} \tag{21}$$

$$M_y = M_{yR} + M_{y,tire} \tag{22}$$

$$M_z \approx 0 \tag{23}$$

<Transformation of Equations of Motion>

An input value which is inputted into the ECU 600 in the present embodiment can expressed by, for example, the following matrix $U_1$ or $U_2$. Note, here, that $U_1$ and $U_2$ are each a vector expressed by a matrix of q×1 and q=8 in $U_1$ and q=6 in $U_2$. An observation which is inputted into the ECU 600 can be expressed by the following matrix Y. Note, here, that Y is a vector expressed by a matrix of p×1 and, for example, p=5 in the present embodiment.

$$U_1 = [TireSt_{fl}, TireSt_{fr}, TireSt_{rl}, TireSt_{rr}, DmapF_{fl}, DmapF_{fr}, DmapF_{rl}, DmapF_{rr}]^T$$

$$U_2 = [\Sigma F_{x0}, \Sigma F_{y0}, DmapF_{fl}, DmapF_{fr}, D_{map}F_{rl}, D_{map}F_{rr}]^T$$

$$Y = [r, TireSt_{fl}, TireSt_{fr}, TireSt_{rl}, TireSt_{rr}]^T$$

The foregoing equations of motion can be expressed by the following expressions (24) and (25).

$$\dot{X} = f(X, U) \tag{24}$$

$$Y = h(X) \tag{25}$$

With use of a Jacobian matrix ($J_x$, $J_u$), the following expression (26) is derived from the expression (24), and the following expression (27) is derived from the expression (25). The last term on the right-hand side of each of the expressions (26) and (27) indicates an error.

$$f(X, U) = f(X_0, U_0) + J_x(X_0, U_0)(X - X_0) + J_0(X_0, U_0)(U - U_0) + O^2(X, U) \tag{26}$$

$$h(X) = h(\dot{X}_0) + \dot{J}_x(\dot{X}_0)(X - X_0) + \dot{O}^2(X) \tag{27}$$

Here, in a case where $f(X_0, U_0) = 0$ and $h(X_0) = 0$, the second term and the third term on the right-hand side of the expression (26) are expressed by expressions (28) and (29), respectively, and the second term on the right-hand side of the expression (27) is expressed by an expression (30).

$$A_c \equiv J_X(X_0, U_0) = \begin{bmatrix} \frac{\partial f_1}{\partial X_1} & \cdots & \frac{\partial f_1}{\partial X_n} \\ \vdots & \ddots & \vdots \\ \frac{\partial f_n}{\partial X_1} & \cdots & \frac{\partial f_n}{\partial X_n} \end{bmatrix}_{(X_0, U_0)} \tag{28}$$

$$B_c \equiv J_U(X_0, U_0) = \begin{bmatrix} \frac{\partial f_1}{\partial U_1} & \cdots & \frac{\partial f_1}{\partial U_q} \\ \vdots & \ddots & \vdots \\ \frac{\partial f_n}{\partial U_1} & \cdots & \frac{\partial f_n}{\partial U_q} \end{bmatrix}_{(X_0, U_0)} \tag{29}$$

$$C_c \equiv \dot{J}_X(\dot{X}_0) = \begin{bmatrix} \frac{\partial h_1}{\partial h_1} & \cdots & \frac{\partial h_1}{\partial h_n} \\ \vdots & \ddots & \vdots \\ \frac{\partial h_p}{\partial h_1} & \cdots & \frac{\partial h_p}{\partial h_n} \end{bmatrix}_{(X_0)} \tag{30}$$

Therefore, the expression (24) is expressed by the following expression (31). Thus, the foregoing equations of motion are expressed by a linear system which is calculated linearly. Here, in a case where the expression (31) is discretized, expressions (32), (33), and (34) below are derived. In the expression (32), $A_c$ is expressed as a system matrix which expresses a property inherent in the vehicle 900. In the expression (33), $B_c$ is expressed as an input matrix which expresses an effect of input on the vehicle 900. In the expression (34), $C_c$ is expressed as an observation matrix for outputting an observable from the vehicle 900. As is clear from the state quantity and the foregoing matrices $U_1$ and $U_2$, the vehicle model includes the elements of the vehicle 900, and is a single model which indicates behavior of the entire vehicle.

$$\dot{X} = A_c X + B_c U \tag{31}$$

<Discretization of Matrices>

As described above, the Ac, Bc, and Cc matrices are discretized by the following expressions (32), (33), and (34), respectively. That is, Ac denotes a discretized system matrix, Bc denotes a discretized input matrix, and Cc denotes a discretized observation matrix. Note that, in the expression (32), $L^{-1}$ denotes an inverse Laplace operation process, s denotes a Laplace operator, and I denotes a unit matrix. In the expression (33), $\Delta t$ denotes a sampling time.

$$A = \mathcal{L}^{-1}\{(sI - A_c)^{-1}\}_{t=\Delta t} = e^{A_c \Delta t} \tag{32}$$

$$B = (\int_{\tau=0}^{\Delta t} e^{A_c \tau} d\tau) B_c = A_c^{-1}(A - I) B_c \tag{33}$$

$$C = C_c \tag{34}$$

<Vehicle Model>

The vehicle model for estimation of the state quantity of the vehicle in the present embodiment can be expressed by the following expressions (35) and (36). As described above, the vehicle model includes the elements of the vehicle 900, and is a single model which indicates the behavior of the entire vehicle. Here, a subscript "k" denotes any step in a discretized state, and k−1 denotes a step which is one step before k.

$$\dot{\hat{X}}_k = A\hat{X}_{k-1} + B\hat{U}_k \tag{35}$$

$$\hat{Y}_k = C\hat{X}_{k-1} \tag{36}$$

In the expressions (35) and (36), $\hat{X}_k$ hat is the state quantity of the vehicle model, i.e., an estimated state quantity of the vehicle. The $X_k$ hat is expressed by the following matrix.

$$\hat{X}_k = \begin{bmatrix} w_k \\ p_k \\ q_k \\ r_k \\ w_{1flk} \\ w_{1frk} \\ w_{1rlk} \\ w_{1rrk} \\ DampF_{flk} \\ DampF_{frk} \\ DampF_{lrk} \\ DampF_{rrk} \\ TireSt_{flk} \\ TireSt_{frk} \\ TireSt_{rlk} \\ TireSt_{rrk} \end{bmatrix}$$

$U_k$ hat is an input value, and is expressed by, for example, $U1_k$ hat or $U2_k$ which are expressed by the following expressions, respectively.

$$\hat{U}_{1k} = [TireSt_{flk}, TireSt_{frk}, TireSt_{rlk}, TireSt_{rrk}, DampF_{flk}, DampF_{frk}, DampF_{rlk}, DampF_{rrk}]^T$$

$$\hat{U}_{2k} = [\Sigma F_{x0k}, \Sigma F_{y0k}, DampF_{flk}, DampF_{frk}, DampF_{rlk}, DampF_{rrk}]^T$$

Further, $Y_k$ hat is an observable, i.e., an estimated observable of the vehicle. The $Y_k$ hat is expressed by the following matrix.

$$\hat{Y}_k = [r_k, TireSt_{flk}, TireSt_{frk}, TireSt_{rlk}, TireSt_{rrk}]^T$$

Embodiment 1

In Embodiment 1, a state quantity which follows the foregoing logic is calculated, and operation of each of suspensions 100 is controlled with use of the state quantity.

[Functional Configuration of ECU]

Figure 2:
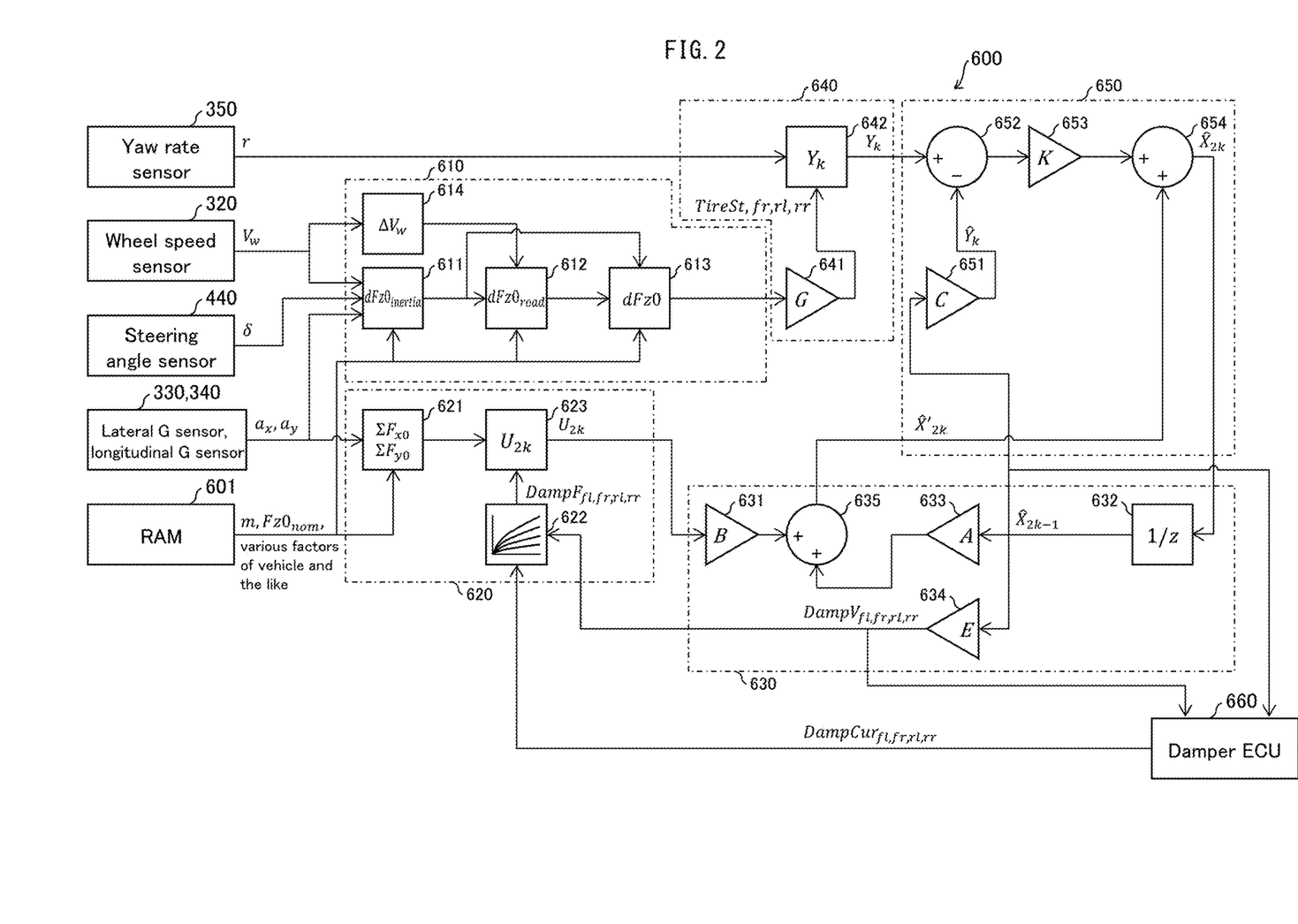
FIG. 2 is a block diagram illustrating an example of a functional configuration of a control device in accordance with Embodiment 1 of the present invention.

FIG. 2 is a block diagram illustrating an example of a functional configuration of a control device in accordance with Embodiment 1 of the present invention.

As illustrated in FIG. 2, an ECU (control device) 600 includes a ground contact load calculating section 610, an input quantity calculating section 620, a first state quantity calculating section 630, an observable calculating section 640, a second state quantity calculating section 650, and a damper ECU 660. As obtaining sections for obtaining physical quantities which relate to a vehicle and which are used in control in Embodiment 1, a yaw rate sensor 350, wheel speed sensors 320, a steering angle sensor 440, a lateral G sensor 330, a longitudinal G sensor 340, and an RAM 601 are connected to the ECU 600. The ground contact load calculating section 610, the input quantity calculating section 620, the first state quantity calculating section 630, the observable calculating section 640, and the second state quantity calculating section 650 correspond to a state quantity calculating device.

The ground contact load calculating section 610 calculates a ground contact load. The ground contact load is a load which acts in a vertical direction under a spring of the vehicle. The ground contact load calculating section 610 includes an inertia load calculating section 611, a road surface load calculating section 612, a ground contact load computing section 613, and a wheel speed variation calculating section 614 which calculates a wheel speed variation $\Delta Vw$ from a wheel speed $Vw$ obtained by each of the wheel speed sensors 320.

The inertia load calculating section 611 calculates an inertia load. The inertia load is a ground contact load component resulting from a change in behavior due to an inertial force which acts on a vehicle 900. For example, the inertia load calculating section 611 calculates an inertia load $dFZ0_{inertiafl, fr, rl, rr}$ of each of wheels with use of, as input values, the wheel speed $Vw$ obtained by a corresponding one of the wheel speed sensors 320, a steering angle $\delta_s$ obtained by the steering angle sensor 440, a lateral acceleration $a_y$ obtained by the lateral G sensor 330, a longitudinal acceleration $a_x$ obtained by the longitudinal G sensor 340, and various factors of the vehicle, such as a vehicle weight m, which are stored in the RAM 601. Note that in a case where the letter "d" precedes a physical quantity of the vehicle, the letter "d" means a variation or a difference in the physical quantity.

The road surface load calculating section 612 calculates a road surface load from the wheel speed, the wheel speed variation, a steady load $Fz0_{nom}$, and the inertia load. The road surface load is a ground contact load component resulting from unevenness of a road surface. For example, the road surface load calculating section 612 calculates a road surface load $dFZ0_{roadfl, fr, rl, rr}$ of each of the wheels with use of, as input values, the wheel speed variation $\Delta Vw$ which is calculated by the wheel speed variation calculating section 614, the inertia load $dFz0_{inertiafl, fr, rl, rr}$ of the each of the wheels which is calculated by the inertia load calculating section 611, and the vehicle weight m, the steady load $Fz0_{nom}$, the various factors of the vehicle, and the like which are stored in the RAM 601.

The ground contact load computing section 613 computes a ground contact load from the inertia load and the road surface load. For example, the ground contact load computing section 613 calculates a ground contact load $dFz0_{fl, fr, rl, rr}$ of each of the wheels with use of, as input values, the inertia load $dFZ0_{inertiafl, fr, rl, rr}$ of the each of the wheels which is calculated by the inertia load calculating section 611, the road surface load $dFZ0_{roadfl, fr, rl, rr}$ of the each of the wheels which is calculated by the road surface load calculating section 612, and the steady load $Fz0_{nom}$ (not illustrated).

The input quantity calculating section 620 calculates an input quantity with use of at least a sensor value of the G sensor included in the vehicle. For example, the input quantity calculating section 620 calculates an input quantity with use of the G sensor value, the vehicle weight, and a damper electric current value. The input quantity calculating section 620 includes a computing section 621, a map 622, and an input quantity configuring section 623.

The computing section 621 calculates a longitudinal force $\Sigma R_x$ which acts on the centroid of a vehicle body 200 and a lateral force $\Sigma R_y$ which acts on the centroid of the vehicle body 200, with use of, as input values, for example, the lateral acceleration $a_y$ which is obtained by the lateral G sensor 330, the longitudinal acceleration $a_x$ which is obtained by the longitudinal G sensor 340, and the vehicle weight m which is stored in the RAM 601.

The map 622 shows a correlation between (i) a suspension stroke speed and the damper electric current and (ii) a damper attenuation, and can be expressed by a graph or an expression. For example, the map 622 outputs, with use of, as input values, a suspension stroke speed $DampV_{fl, fr, rl, rr}$ (described later) of each of the wheels and a damper electric current $DampCur_{fl, fr, rl, rr}$ of the each of the wheels, a damper attenuation $DampF_{fl, fr, rl, rr}$ of the each of the wheels which corresponds to the input values. The damper electric current $DampCur_{fl, fr, rl, rr}$ is a feedback value from a damper ECU 640.

The input quantity configuring section 623 configures an input quantity with use of, as input values, the longitudinal force $\Sigma R_x$ and the lateral force $\Sigma R_y$ which are calculated by the computing section 621 and the damper attenuation $DampF_{fl, fr, rl, rr}$ which is outputted by the map 622. The input quantity is expressed by, for example, the above-described matrix $U_2$.

The first state quantity calculating section 630 calculates a first state quantity of the vehicle 900 by inputting, into the above-described vehicle model, the input quantity which is calculated by the input quantity calculating section 620. The first state quantity calculating section 630 includes computing sections 631 and 633, a delaying section 632, an extracting section 634, and an adding section 635.

The computing section 631 calculates a product of the input quantity which is calculated by the input quantity configuring section 623 and an input matrix B. This causes an effect of the input quantity on the vehicle model to be reflected in the first state quantity to be calculated later.

The delaying section 632 causes a second state quantity $X_{2k}$ hat in a step k (described later) to be a second state quantity $X_{2k-1}$ hat in a step k−1 which is one step before the step k.

The computing section 633 calculates a product of the second state quantity $X_{2k-1}$ hat which is generated by the delaying section 632 and a system matrix A. This causes a property inherent in the vehicle model to be reflected in the first state quantity to be calculated later.

The extracting section 634 calculates the suspension stroke speed $DampV_{fl, fr, rl, rr}$ of each of the wheels from the second state quantity $X_{2k-1}$ hat which is generated by the delaying section 632. For example, the extracting section 634 extracts a component of a suspension stroke of each of the wheels from the second state quantity $X_{2k-1}$ hat, differentiates the extracted component as appropriate or adjusts the extracted component with use of an appropriate gain, and thereby calculates the suspension stroke speed $DampV_{fl, fr, rl, rr}$ of the each of the wheels. The calculated value is expressed by a 4×1 matrix which is constituted by the suspension stroke speed, and is an input value which is inputted into the foregoing map 622.

The adding section 635 adds up the product of the input quantity and the input matrix B, which is calculated by the computing section 631, and the product of the second state quantity $X_{2k-1}$ hat and the system matrix A, which is calculated by the computing section 633, and thereby calculates a first state quantity $X'_{2k}$ hat.

The observable calculating section 640 calculates an observable from the ground contact load which is calculated by the ground contact load calculating section 610 and a spring constant gain of each of tires. The observable calculating section 640 includes a tire stroke calculating section 641 and an observable configuring section 642.

A tire stroke displacement $TireSt_{ii}$ of each of the wheels is expressed by the following expression (37). The tire stroke calculating section 641 calculates a tire stroke $TireSt_{fl, fr, rl, rr}$ of each of the wheels from the ground contact load $dFz0_{fl, fr, rl, rr}$ of the each of the wheels which is calculated by the ground contact load computing section 613 and a spring constant gain G of a corresponding one of the tires. The tire stroke displacement is an aspect of an amount of a change in a tire.

$$TireSt_{ii} = G_{ii} dFz0_{ii} \quad (37)$$

The observable configuring section 642 configures an observable which includes a current amount of a change in each of the tires. For example, the observable configuring section 642 configures an observable $Y_k$ with use of, as input values, the tire stroke displacement which is calculated by the tire stroke calculating section 641 and a detected value of a yaw rate which is obtained by the yaw rate sensor 350. The tire stroke displacement is an amount of a change in a tire radius and is an aspect of an amount of a change in a tire. The observable $Y_k$ is, for example, a 5×1 matrix, and is expressed as below. Note, here, that the subscript "sens" means an observable.

$$Y_k = [r_{sens\ k}, TireSt_{fl\ sens\ k}, TireSt_{fr\ sens\ k}, TireSt_{rl\ sens\ k}, TireSt_{rr\ sens\ k}]^T$$

Note, here, that $r_{sens\ k}$ is the detected value of the yaw rate sensor 350, $TireSt_{ii\ sens\ k}$ is the tire stroke displacement which is calculated by the tire stroke calculating section 641.

Note that the observable calculating section 640 can be configured not to include the tire stroke calculating section 641, and can be alternatively configured such that the observable configuring section 642 directly configures, as the observable, the ground contact load which is computed by the ground contact load computing section 613.

The second state quantity calculating section 650 calculates the second state quantity $X_{2k}$ hat of the vehicle 900, by correcting the first state quantity $X'_{2k}$ hat of the vehicle 900 which is calculated by the first state quantity calculating section 630 with use of the observable $Y_k$ which is calculated by the observable calculating section 640. The second state quantity calculating section 650 includes computing sections 651 and 653, a subtracting section 652, and an adding section 654.

The computing section 651 calculates an observable from an existing state quantity. For example, the computing section 651 calculates a predicted observable $Y_k$ hat which is predicted from a state quantity, by multiplying $X_{2k-1}$ hat, which is expressed by an n×1 matrix and which is outputted by the delaying section 632, by an output matrix C which is expressed by a p×n matrix.

The subtracting section 652 calculates a subtracted value of an observable by subtracting the estimated observable $Y_k$ hat, which is calculated by the computing section 651, from the observable Yk, which is configured by the observable configuring section 642. It can be said that $Y_k$ is an observable which is based on an actual measurement and Yk hat is an estimated observable.

The computing section 653 multiplies the subtracted value of the observable, which is calculated by the subtracting section 652, by a Kalman gain K. The Kalman gain K is a gain of a Kalman filter.

The adding section 654 adds up the first state quantity $X'_{2k}$ hat, which is calculated by the adding section 635, and a numerical value which is obtained by multiplying, by the Kalman gain K, a difference that is obtained by subtracting the estimated observable from the observable based on the actual measurement. The second state quantity $X_{2k}$ hat, which is a corrected state quantity, is thus calculated. The second state quantity $X_{2k}$ hat is outputted to the foregoing delaying section 632.

In this manner, the second state quantity calculating section 650 corrects the first state quantity $X'_{2k}$ hat with further use of the Kalman gain. Therefore, it can be said that the second state quantity calculating section 650 constitutes a Kalman filtering block.

The damper ECU 660 controls each of the suspensions 100 with use of a calculated value of the state quantity of the vehicle 900. The damper ECU 660 corresponds to a control section which controls a device that is included in the vehicle 900. The damper ECU 670 controls, by, for example, skyhook control, operation of each of the suspensions 100 with use of, as input values, for example, the second state quantity $X_{2k-1}$ hat, which is outputted from the delaying section 632, and the suspension stroke speed DampV$_{fl, fr, rl, rr}$ of a corresponding one of the wheels, which is extracted from the second state quantity $X_{2k-1}$ hat by the extracting section 634.

[Effects]

As is clear from the above description, in Embodiment 1, the ECU 600 includes the ground contact load calculating section 610, the input quantity calculating section 620, the first state quantity calculating section 630, the observable calculating section 640, and the second state quantity calculating section 650. In the ECU 600, an observable which is based on a ground contact load is expressed by a displacement, i.e., a unit of length, and a state quantity is calculated with use of the observable. On the other hand, in a case where each of the suspensions 100 is controlled, a control variable of the each of the suspensions 100 is usually expressed by displacement information of an object to be controlled, i.e., a physical quantity which is expressed by a unit of length. Therefore, since the observable is expressed as information in the same dimension as the control variable, a result of control of the state quantity which is based on a result of a computation with use of the observable is stable in the above control. In a case where an observable which does not express displacement information, i.e., which is in a unit other than a unit of length is used in computation for such control, behavior resulting from a displacement of an object to be controlled on the basis of a computation result may not be stable. As a result, the computation result for control may diverge without converging. Therefore, in a case where such a unit other than a unit of length is used in computation for control, use of a divergent computation result may result in a deterioration of control accuracy and/or the like. In order to prevent this, it is necessary to take another measure such as a process of offsetting an entire system so that a computation result always falls within a predetermined range. Therefore, in Embodiment 1, it is possible to stabilize calculation of a state quantity with a simpler configuration than in a case where a state quantity is calculated on the basis of an observable which is in a unit that does not express positional information.

In Embodiment 1, the observable is calculated from a value obtained by a general-purpose sensor, and such an observable is used to correct the state quantity. That is, in Embodiment 1, the state quantity which is corrected with use of this observable is calculated. Therefore, in Embodiment 1, a better estimation result of the state quantity is obtained than in a case where the state quantity is not corrected with use of the observable. Therefore, according to Embodiment 1, it is possible to highly accurately calculate the state quantity of a vehicle than in a case where the foregoing observable is not used.

Furthermore, in Embodiment 1, the observable is calculated with use of, as a sensor value, the value obtained by the general-purpose sensor. Therefore, it is possible to highly accurately calculate the state quantity of the vehicle as described above, without use of a special sensor.

In Embodiment 1, the observable includes a current amount of a change in a tire. Therefore, the observable is suitable as a physical quantity which expresses a state of the vehicle that is running. Therefore, this configuration is more effective as the state quantity for highly accurately controlling a running state of the vehicle.

Further, in Embodiment 1, the amount of the change in the tire is an amount of a change in a tire radius, i.e., a tire stroke displacement. The tire stroke displacement is expected to contribute more to calculation of the state quantity, among amounts of changes in tire. Therefore, this configuration is still more effective from the viewpoint of preventing an error in calculation of the state quantity.

In Embodiment 1, the second state quantity calculating section 650 constitutes a Kalman filtering block, and corrects a first state quantity of the vehicle 900 by Kalman filtering with further use of a Kalman gain. In this manner, in Embodiment 1, the first state quantity is calculated on the basis of the observable which is corrected by a Kalman filter and is accordingly more suitable. Therefore, the above configuration is still more effective from the viewpoint of calculating the state quantity which is more appropriately corrected on the basis of the appropriately corrected observable, than in a case where the state quantity is calculated with use of the observable which does not involve such a correction.

In Embodiment 1, the ground contact load calculating section 610 includes the inertia load calculating section 611, the road surface load calculating section 612, and the ground contact load computing section 613. Therefore, it is possible to accurately estimate the ground contact load from the value detected by the general-purpose sensor. Thus, this configuration is still more effective from the viewpoint of increasing accuracy of the observable without use of a special sensor.

A vehicle model in Embodiment 1 is a single model which can express behavior of the entire vehicle. Therefore, an effect of the entire vehicle which is exerted on all wheels is reflected in calculation of the state quantity. For example, there is a situation in which an effect that is exerted on any of the wheels has a further effect on a vehicle body, another one of the wheels, and/or the like. In a case where single-wheel models, each of which allows calculation of a state quantity to be completed for a corresponding one of wheels and the number of which corresponds to the number of the wheels, are used in combinations, a state quantity which is calculated in such a situation may differ from actual behavior of a vehicle. Therefore, this configuration is still more effective from the viewpoint of broadening a scope of a situation in which the state quantity of the vehicle can be appropriately calculated, than in a case where single-wheel models, each of which allows calculation of a state quantity to be completed for a corresponding one of wheels, are used.

Further, in Embodiment 1, the ECU 600 includes the foregoing state quantity calculating device and the damper ECU 660 which is a control section. Therefore, it is possible to appropriately control a device which is included in the vehicle 900, with use of the state quantity calculated as described above, so that a running state of the vehicle 900 which is running is appropriately controlled. Therefore, this configuration makes it possible to further enhance running stability of the vehicle, as compared with a case where control is carried out without use of the state quantity.

In Embodiment 1, examples of the device which is included in the vehicle 900 include the suspensions 100 each of which is an electronically controlled steering device.

Thus, according to this configuration, it is possible to more appropriately control each of the suspensions of the vehicle which is running.

Further, in Embodiment 1, the vehicle 900 includes the ECU 600. Therefore, the running state of the vehicle 900 is appropriately controlled. Thus, according to this configuration, it is possible to provide the vehicle 900 which has enhanced running stability.

Further, in Embodiment 1, a method of calculating a state quantity is carried out which includes the steps of: (a) calculating a ground contact load which is a load that acts in a vertical direction under a spring of a vehicle; (b) calculating an input quantity with use of a G sensor value, a vehicle weight, and a damper electric current value; (c) calculating a first state quantity of the vehicle by inputting the input quantity, which is calculated in the step (b), into a vehicle model; (d) calculating an observable with use of the ground contact load, which is calculated in the step (a), and a spring constant gain of a tire; and (e) calculating a second state quantity of the vehicle by correcting the first state quantity of the vehicle, which is calculated in the step (c), with use of the observable, which is calculated in the step (d). Therefore, it is possible to highly accurately calculate the state quantity of the vehicle 900.

Embodiment 2

Another embodiment of the present invention will be described below. For convenience of explanation, members having the same functions as those of the members described in the above embodiments are denoted by the same reference numerals, and description thereof will not be repeated.

In Embodiment 2, an ECU 600 further includes a wheel speed correcting section. The wheel speed correcting section corrects a wheel speed by, for example, receiving, as an input value, a wheel speed Vw obtained by each of wheel speed sensors 320 and removing, from the wheel speed Vw, a wheel speed variation component resulting from a change in suspension geometry. The wheel speed correcting section outputs the wheel speed Vw thus corrected to a ground contact load calculating section 610. The ground contact load calculating section 610 calculates a ground contact load as described above with use of the corrected wheel speed Vw. The wheel speed correcting section may correct a wheel speed difference ΔVw, instead of the wheel speed Vw.

For example, in a case where an axial direction of a suspension is inclined with respect to a vertical direction, expansion and contraction of the suspension causes a tire to receive a force which acts in the axial direction, so that a wheel speed varies depending on the force. Each of the wheel speed sensors 320 detects a wheel speed which varies depending on such a force. Such a variation of the wheel speed that results from operation of a corresponding one of suspensions is noise in the above-described calculation of a state quantity. The wheel speed correcting section removes such a noise component from a value obtained by each of the wheel speed sensors 320. Therefore, in Embodiment 2, the ground contact load calculating section 610 is capable of calculating the ground contact load with use of the wheel speed Vw from which the noise is removed, and an observable calculating section 640 can calculate, with use of the ground contact load, a tire stroke of a corresponding one of wheels. In this manner, in Embodiment 2, a noise component is removed before calculation of a state quantity.

In Embodiment 2, the ECU 600 further includes the wheel speed correcting section which corrects a wheel speed by removing a wheel speed variation component resulting from a change in suspension geometry. This configuration is still more effective from the viewpoint of calculating a highly accurate state quantity, than in a case where the ECU 600 does not include the wheel speed correcting section.

Embodiment 3

Another embodiment of the present invention will be described below. For convenience of explanation, members having the same functions as those of the members described in the above embodiments are denoted by the same reference numerals, and description thereof will not be repeated.

In Embodiment 3, an ECU 600 further includes a reference model which allows calculation of an ideal vehicle state. The reference model includes, for example, one or more models which relate to a running state of a vehicle 900. In Embodiment 3, the reference model includes, for example, a first model and a second model. The first model emphasizes running performance, and the second model emphasizes ride comfort. The first model and the second model are each in an appropriate form so as to be used in the above-described calculation of a state quantity. For example, each of these models may be expressed in the form of a gain in gain processing with respect to a calculated value or in the form of a map. Each of these models is stored in a RAM 601 in the form of, for example, a gain for the first model, a map for the second model, or the like.

The ECU 600 may further include a model input section which receives, from a driver of the vehicle 900, an instruction on the reference model. When the model input section receives, from the driver, an operation of choosing one of the first model and the second model, the ECU 600 chooses one of these reference models in response to the operation, and calculates a state quantity with use of a gain or a map which corresponds to the selected model.

The damper ECU 660 controls suspensions 100 so that a difference between the ideal vehicle state and the state quantity is reduced. For example, in a case where the state quantity is calculated on the basis of the first model, the damper ECU 660 controls the suspensions 100 by causing a control variable for enhancing operational stability to be greater than a control variable for enhancing ride comfort so that tires are more grounded. In a case where the state quantity is calculated on the basis of the second model, the damper ECU 660 controls the suspensions 100 by causing the control variable for enhancing the ride comfort to be greater than the control variable for enhancing the operational stability so that comfort of a passenger in the vehicle 900 during running is further enhanced.

In Embodiment 3, the ECU 600 further includes the reference model, and the damper ECU 660 controls the suspensions 100 so that a difference between an ideal vehicle state and a state quantity is reduced. This configuration is still more effective from the viewpoint of realizing a desired vehicle state with use of a highly accurately calculated state quantity as described above.

Embodiment 4

Another embodiment of the present invention will be described below. For convenience of explanation, members having the same functions as those of the members described in the above embodiments are denoted by the same reference numerals, and description thereof will not be repeated.

Figure 3:
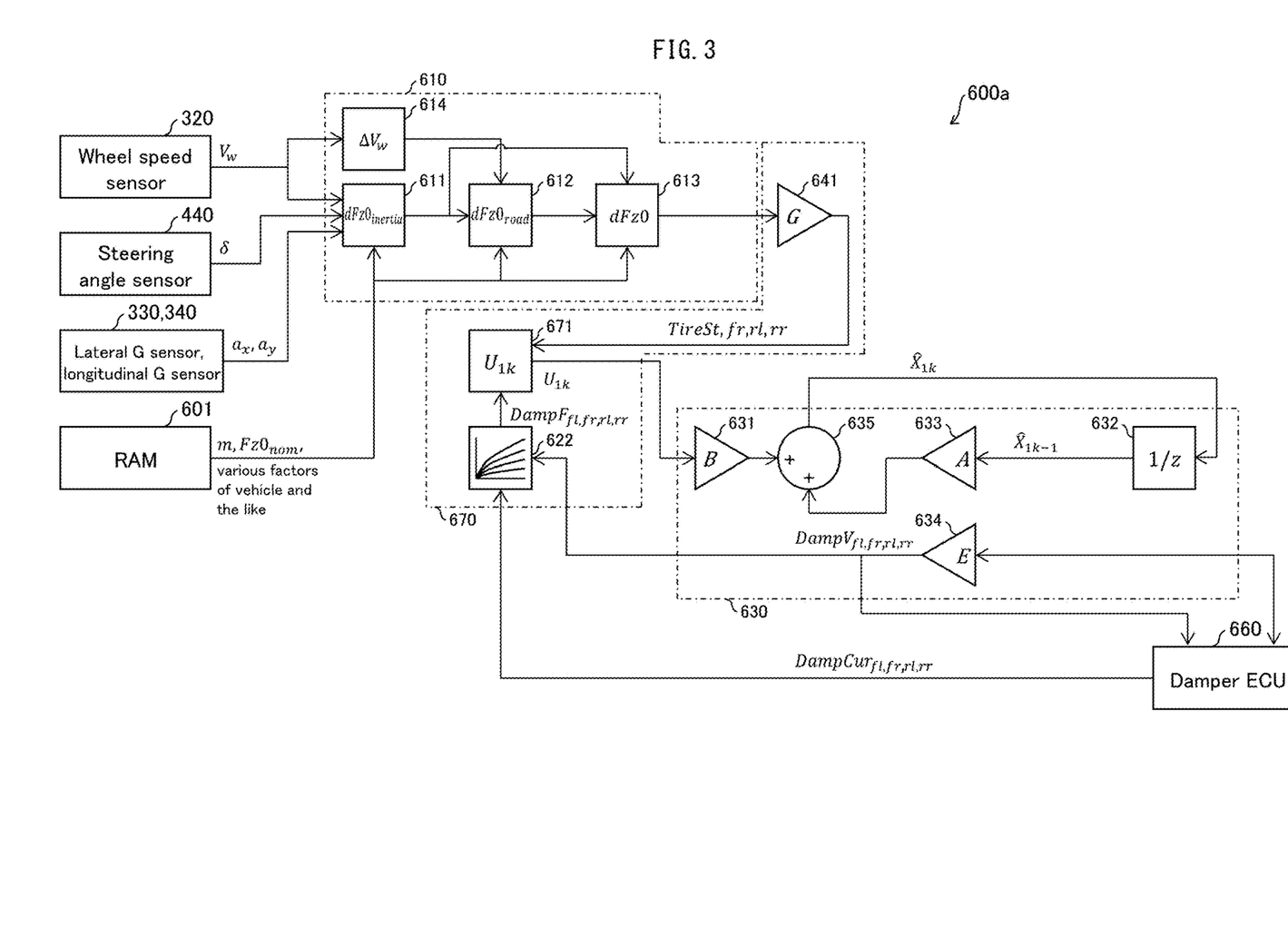
FIG. 3 is a block diagram illustrating an example of a functional configuration of a control device in accordance with Embodiment 3 of the present invention.

FIG. 3 is a block diagram illustrating an example of a functional configuration of a control device in accordance with Embodiment 3 of the present invention. An ECU 600a in Embodiment 3 differs from the ECU 600 in the foregoing embodiments in that the ECU 600a in Embodiment 3 includes 670 instead of the input quantity calculating section 620 and does not include the observable calculating section 640 and the second state quantity calculating section 650. For example, as illustrated in FIG. 3, the ECU 600a includes a ground contact load calculating section 610, a tire change amount calculating section 670, a first state quantity calculating section 630, and a damper ECU 660. To the ECU 600a, wheel speed sensors 320, a steering angle sensor 440, a lateral G sensor 330, a longitudinal G sensor 340, and a RAM 601 are connected.

The tire change amount calculating section 670 calculates an amount of a change in each of tires. The amount of the change in each of the tires is, for example, a tire stroke displacement which is an amount of a change in a radius of each of the tires. The tire change amount calculating section 670 includes a tire stroke calculating section 641, a map 622, and a computing section 671.

The computing section 671 obtains a matrix $U_k$ by inputting, into a matrix $U_{1k}$ described above, a tire stroke $TireSt_{fl, fr, rl, rr}$ of each of wheels which is calculated by the tire stroke calculating section 641 and a damper attenuation $DampF_{fl, fr, rl, rr}$ which is outputted from the map 622.

In the first state quantity calculating section 630, a computing section 631 multiplies the matrix $U_k$, which is calculated by the computing section 671, by an input matrix B. The input matrix B is a matrix which expresses an effect of input on a system (equation of motion).

A delaying section 632 causes a state quantity $X_k$ hat to be a state quantity in a step which is one step before. In Embodiment 4, a state quantity is expressed by $X_{1k}$ hat, and a state quantity in a step k-1 is expressed by $X_{1k-1}$ hat.

A computing section 633 calculates a product of the state quantity $X_{1k-1}$ hat and a system matrix A.

As described above, an extracting section 634 extracts a component of a suspension stroke of each of the wheels from the state quantity $X_{1k-1}$ hat, adjusts the extracted component as appropriate, and thereby calculates a suspension stroke speed $DampV_{fl, fr, rl, rr}$ of the each of the wheels. The calculated value is an input value which is inputted into the map 622.

An adding section 635 adds up a product of the matrix $U_k$ and the input matrix B and the product of the state quantity $X_{1k-1}$ hat and the system matrix A, and thereby calculates a state quantity $X_{1k}$ hat.

The damper ECU 660 controls each of suspensions 100 with use of a calculated value of the state quantity of the vehicle 900. The damper ECU 660 obtains the state quantity $X_{1k-1}$ hat from the delaying section 632, and obtains the suspension stroke speed $DampV_{fl, fr, rl, rr}$ of each of the wheels from the extracting section 634. The damper ECU 660 controls operation of each of the suspensions 100 by, for example, skyhook control, depending on these obtained values. The damper ECU 660 also outputs a damper electric current $DampCur_{fl, fr, rl, rr}$ of each of the wheels to the map 622.

As is clear from the above explanation, in Embodiment 4, the ECU 600a includes the ground contact load calculating section 610, the tire change amount calculating section 670, and the first state quantity calculating section 630. In the ECU 600a, an amount of a change in a tire is used to calculate a state quantity on the basis of a ground contact load. Therefore, similarly to the foregoing embodiments, since the state quantity is calculated on the basis of the amount of the change in the tire, which is a calculated value that is expressed by a displacement, i.e., a unit of length, a result of calculation of the state quantity is stable. Therefore, also in Embodiment 4, similarly to the foregoing embodiments, it is possible to stabilize the calculation of the state quantity, as compared with a case where the state quantity is calculated on the basis of an observable which does not express displacement information, i.e., which is in a unit other than a unit of length.

In Embodiment 4, an observable is calculated with use of, as a sensor value, a value obtained by a general-purpose sensor. Therefore, it is possible to highly accurately calculate the state quantity of a vehicle as described above, without use of a special sensor.

In Embodiment 4, the amount of the change in the tire is a tire stroke displacement. Thus, similarly to the foregoing embodiments, this configuration is still more effective from the viewpoint of preventing an error in the calculation of the state quantity.

In Embodiment 4, the ground contact load calculating section 610 includes the inertia load calculating section 611, the road surface load calculating section 612, and the ground contact load computing section 613. Therefore, it is possible to accurately estimate the ground contact load from the value detected by the general-purpose sensor. Therefore, this configuration makes it possible to calculate the ground contact load and the amount of the change in the tire without use of a special sensor, and makes it possible to highly accurately calculate the state quantity.

A vehicle model in Embodiment 4 is a single model which can express behavior of the entire vehicle. Therefore, an effect of the entire vehicle which is exerted on all wheels is reflected in the calculation of the state quantity. For example, there is a situation in which an effect that is exerted on any of the wheels has a further effect on a vehicle body, another one of the wheels, and/or the like. In a case where single-wheel models, each of which allows calculation of a state quantity to be completed for a corresponding one of wheels and the number of which corresponds to the number of the wheels, are used in combinations, a state quantity which is calculated in such a situation may differ from actual behavior of a vehicle. Therefore, similarly to the foregoing embodiments, this configuration is still more effective from the viewpoint of broadening a scope of a situation in which the state quantity of the vehicle can be appropriately calculated, than in a case where single-wheel models, each of which allows calculation of a state quantity to be completed for a corresponding one of wheels, are used.

In Embodiment 4, the ECU 600a further includes the damper ECU 660. Therefore, similarly to the foregoing embodiments, this configuration makes it possible to further enhance running stability of the vehicle, as compared with a case where control is carried out without use of the state quantity.

In Embodiment 4, examples of the device which is included in the vehicle 900 include the suspensions 100 each of which is an electronically controlled steering device. Thus, according to this configuration, similarly to the foregoing embodiments, it is possible to more appropriately control each of the suspensions of the vehicle which is running.

Furthermore, in Embodiment 4, the vehicle 900 includes the ECU 600. Thus, according to this configuration, similarly to the foregoing embodiments, it is possible to provide the vehicle 900 which has enhanced running stability.

Embodiment 5 Estimation of Ground Contact Load with Use of Camera

Another embodiment of the present invention will be described below. For convenience of explanation, members having the same functions as those of the members described in the above embodiments are denoted by the same reference numerals, and description thereof will not be repeated.

An ECU in Embodiment 5 is similar to those in the foregoing embodiments, except that (i) a vehicle 900 is provided with a camera which is capable of capturing an image of a road surface in a traveling direction and (ii) a road surface load calculating section 612 calculates a road surface load on the basis of the image which is captured by the camera.

In Embodiment 5, the camera captures an image of a road surface in a travelling direction of the vehicle 900. The road surface load calculating section 612 obtains data on unevenness of the road surface the image of which is captured. Further, the road surface load calculating section 612 calculates a road surface load $dFZ0_{roadfl, fr, rl, rr}$ of each of wheels at the each of the wheels at a time when the vehicle 900 runs on the road surface the image of which is captured, on the basis of a current running state of the vehicle 900, a value obtained by a sensor, and various factors of the vehicle which are stored in a RAM 601.

It is only necessary that the camera is capable of capturing an image of a road surface state such as unevenness in the traveling direction of the vehicle 900, and may be, for example, a camera which is included in a drive recorder.

In Embodiment 5, it is possible to predict a state quantity by estimating a road surface load from an image of a road surface in a traveling direction. Thus, it is possible to, before a vehicle actually passes over a specific part (a part an image of which is captured) of the road surface, predict the state quantity at a time when the vehicle passes over the specific part. Therefore, the above configuration brings about an effect that it is possible to prevent a delay of control which is based on the state quantity, in a running state of the vehicle, as compared with the foregoing embodiments. The ECU in Embodiment further brings about effects corresponding to configurations other than the road surface load calculating section 612, out of effects brought about in the foregoing embodiments.

Embodiment 6

Another embodiment of the present invention will be described below. For convenience of explanation, members having the same functions as those of the members described in the above embodiments are denoted by the same reference numerals, and description thereof will not be repeated.

An ECU in Embodiment 6 has a configuration similar to those in the foregoing embodiments, except that the ECU further includes a steering ECU.

The steering ECU controls a magnitude of an assist torque or a reaction torque to be applied to a steering shaft 420, by adjusting, on the basis of a state quantity $X_k$ hat (or $X_{k-1}$ hat) which is calculated by the ECU, a steering control variable to be supplied to a torque applying section 460.

In Embodiment 6, it is possible to control each of suspensions on the basis of the state quantity so that a vehicle 900 favorably behaves in response to steering. In addition, in Embodiment 6, operation of each of the suspensions is controlled, with reference to a value outputted from the each of the suspensions or a value obtained by a sensor provided around the each of the suspensions, so that a favorable feeling (e.g., ride comfort and steering stability) is provided to a passenger on the basis of the state quantity.

As is clear from the foregoing explanation, Embodiment 6 further includes the steering ECU in addition to a damper ECU. Therefore, it is possible to further enhance both running stability and steering stability of the vehicle 900. Furthermore, Embodiment 6 further brings about effects corresponding to configurations other than the steering ECU, out of effects brought about in the foregoing embodiments.

Embodiment 7

Another embodiment of the present invention will be described below. For convenience of explanation, members having the same functions as those of the members described in the above embodiments are denoted by the same reference numerals, and description thereof will not be repeated.

An ECU in Embodiment 7 has a configuration similar to those in the foregoing embodiments, except that the ECU includes a steering ECU and a power transmission ECU.

The power transmission ECU adjusts an amount of distribution of a driving force of an engine 500, which is to be transmitted to each of wheels of a vehicle 900, between (i) front wheels and (ii) rear wheels or between (i) left wheels and (ii) right wheels on the basis of a state quantity $X_k$ hat (or $X_{k-1}$ hat) which is calculated by the ECU, and thereby controls a rotation speed of each of the wheels which is based on the driving force. The steering ECU is as described in Embodiment 6.

In Embodiment 7, it is possible to control, on the basis of the state quantity, distribution of the driving force of the engine between (i) the front wheels and (ii) the rear wheels or between (i) the left wheels and (ii) the right wheels so that the vehicle 900 favorably behaves in response to steering. Therefore, according to Embodiment 7, it is possible to improve both steering stability and running performance. An example of improving the running performance is improving a turning ability of the vehicle in such a way that yaw is caused in a vehicle body by distributing the driving force of the engine between (i) the left wheels and (ii) the right wheels so that understeering or oversteering is prevented. Furthermore, Embodiment 7 further brings about effects corresponding to configurations other than the power transmission ECU, out of effects brought about in the foregoing embodiments.

[Software Implementation Example]

Control blocks (in particular, the ECU 600, 600*a*) of the state quantity calculating device or the control device in the embodiments of the present invention can be realized by a logic circuit (hardware) which is provided in an integrated circuit (IC chip) or the like or can be alternatively realized by software.

In the latter case, the state quantity calculating device or the control device includes a computer which executes instructions of a program that is software realizing the foregoing functions. The computer, for example, includes at least one processor and at least one computer-readable recording medium in which the program is stored. An object of the present invention can be achieved by the processor of the computer reading and executing the program stored in the recording medium.

Examples of the processor encompass a central processing unit (CPU). Examples of the recording medium encompass a "non-transitory tangible medium" such as a read only memory (ROM), a tape, a disk, a card, a semiconductor memory, and a programmable logic circuit. The computer may further include a random access memory (RAM) or the like in which the program is loaded.

The program can be made available to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

100 Suspension
200 Vehicle body
300, 300A, 300B, 300C, 300D Wheel
310, 310A, 310B, 310C, 310D Tire
320 Wheel speed sensor
330 Lateral G sensor
340 Longitudinal G sensor
350 Yaw rate sensor
410 Steering member
420 Steering shaft
430 Torque sensor
440 Steering angle sensor
460 Torque applying section
470 Rack-and-pinion mechanism
480 Rack shaft
500 Engine
510 Engine torque sensor
520 Engine rotation speed sensor
530 Brake pressure sensor
600, 600a ECU
601 RAM
610 Ground contact load calculating section
611 Inertia load calculating section
612 Road surface load calculating section
613 Ground contact load computing section
620 Input quantity calculating section
621, 631, 633, 651, 653, 671 Computing section
622 Map
623 Input quantity configuring section
630 First state quantity calculating section
632 Delaying section
634 Extracting section
635, 654 Adding section
640 Observable calculating section
641 Tire stroke calculating section
642 Observable configuring section
650 Second state quantity calculating section
652 Subtracting section
670 Tire change amount calculating section
700 Electric generator
800 Battery
900 Vehicle

The invention claimed is:

1. A state quantity calculating device for controlling driving force distribution in a vehicle having an engine, front wheels, rear wheels, right wheels, and left wheels, wherein the state quantity calculating device comprises:
a ground contact load calculating section which calculates a ground contact load that is a load acting in a vertical direction under a spring of a vehicle;
an input quantity calculating section which calculates an input quantity that is a value including a longitudinal force and a lateral force with use of at least a longitudinal acceleration and a lateral acceleration that are sensor values of a G sensor that is included in the vehicle;
a first state quantity calculating section which calculates a first state quantity of the vehicle by inputting the input quantity, which is calculated by the input quantity calculating section, into a vehicle model;
an observable calculating section which calculates a tire stroke displacement from the ground contact load, which is calculated by the ground contact load calculating section, and a spring constant gain of a tire, the tire stroke displacement being an observable which is expressed by a unit of length and being an amount of a change in a tire radius; and
a second state quantity calculating section which constitutes a Kalman filtering block and which calculates a second state quantity of the vehicle by correcting, by Kalman filtering, the first state quantity of the vehicle, which is calculated by the first state quantity calculating section, with use of the observable, which is calculated by the observable calculating section, and a Kalman gain,
wherein the ground contact load calculating section further includes:
an inertia load calculating section which calculates an inertia load that is a ground contact load component resulting from a change in behavior of the vehicle due to an inertial force;
a road surface load calculating section which calculates, from a wheel speed variation, a steady-state value, and the inertia load, a road surface load that is a ground contact load component resulting from unevenness of a road surface; and
a ground contact load computing section which computes the ground contact load from the inertia load and the road surface load;
wherein a calculation obtained with the state quantity calculating device is used to control distribution of a driving force of the engine between:
the front wheels and the rear wheels, and/or
the left wheels and the right wheels.

2. The state quantity calculating device as set forth in claim 1, wherein the ground contact load calculating section further includes a wheel speed correcting section which corrects a wheel speed by removing a wheel speed variation component resulting from a change in suspension geometry.

3. The state quantity calculating device as set forth in claim 1, wherein the vehicle model is a single model which indicates behavior of the entire vehicle.

4. A control device comprising:
the state quantity calculating device recited in claim 1; and a control section which controls a device that is included in the vehicle, with use of a state quantity of the vehicle, which is calculated by the state quantity calculating device.

5. The control device as set forth in claim 4, wherein the device which is included in the vehicle includes at least one device selected from the group consisting of an electronically controlled driving force transmitting device, electronically controlled suspensions, and an electronically controlled steering device.

6. The control device as set forth in claim 4, further comprising
a reference model which allows calculation of an ideal vehicle state,
the control section controlling the device, which is included in the vehicle, so that a difference between the ideal vehicle state and the state quantity is reduced.

7. A vehicle comprising the control device recited in claim 4.

8. The state quantity calculating device as set forth in claim 1, wherein the vehicle model is a single model which indicates behavior of the entire vehicle.

9. A control device comprising:
the state quantity calculating device recited in claim 1; and
a control section which controls a device that is included in the vehicle, with use of a state quantity of the vehicle, which is calculated by the state quantity calculating device.

10. The control device as set forth in claim 9, wherein the device which is included in the vehicle includes at least one device selected from the group consisting of an electronically controlled driving force transmitting device, electronically controlled suspensions, and an electronically controlled steering device.

* * * * *